United States Patent [19]

Peletan

[11] Patent Number: 4,640,811
[45] Date of Patent: Feb. 3, 1987

[54] APPARATUS WITH LINEAR MOVEMENT

[75] Inventor: René Peletan, Saint-Hilaire, France

[73] Assignee: Framatome, Courbevoi, France

[21] Appl. No.: 505,899

[22] Filed: Jun. 22, 1983

Related U.S. Application Data

[63] Continuation-in-part of Ser. No. 209,925, Nov. 24, 1980, abandoned.

[30] Foreign Application Priority Data

Dec. 21, 1979 [FR] France ................................. 79 31398

[51] Int. Cl.⁴ ............................................... G21C 7/12
[52] U.S. Cl. ....................................... 376/228; 310/14
[58] Field of Search ............ 294/86 A; 376/228, 232, 376/233, 235, 262, 219; 74/169; 335/254; 310/12-14

[56] References Cited

U.S. PATENT DOCUMENTS

| | | | |
|---|---|---|---|
| 2,242,431 | 5/1941 | Lucker | 74/169 X |
| 2,575,108 | 11/1951 | Howard | 74/169 X |
| 2,670,881 | 3/1984 | Sjoblom | 74/169 |
| 3,158,766 | 11/1964 | Frisch | 335/254 X |
| 3,162,796 | 12/1964 | Schreiber et al. | 376/232 X |
| 3,278,385 | 10/1966 | Dufrane | 376/233 |
| 3,299,302 | 1/1967 | Frisch | 74/169 |
| 3,356,874 | 12/1967 | Chiapparelli et al. | 310/83 |
| 3,480,807 | 11/1969 | Downs et al. | 376/235 |
| 3,486,095 | 12/1969 | Sherwood et al. | 376/232 |
| 3,580,805 | 5/1971 | Handel | 376/235 |
| 3,825,160 | 7/1974 | Lichtenberger et al. | 376/235 X |
| 3,882,333 | 5/1975 | DeWesse | 376/235 X |
| 3,941,653 | 3/1976 | Thorp, II | 376/235 |
| 3,992,255 | 11/1976 | DeWesse | 376/228 |
| 4,338,159 | 7/1982 | Martin et al. | 376/228 |

FOREIGN PATENT DOCUMENTS

| | | | |
|---|---|---|---|
| 753529 | 7/1970 | Belgium | 376/232 |
| 2459871 | 7/1975 | Fed. Rep. of Germany | 376/235 |
| 1371802 | 8/1964 | France | 376/232 |
| 0910203 | 11/1962 | United Kingdom | 376/228 |

Primary Examiner—Deborah L. Kyle
Assistant Examiner—Dan Wasil
Attorney, Agent, or Firm—Pollock, Vande Sande & Priddy

[57] ABSTRACT

Magnetic actuators with dogs for positioning regulating rods in a nuclear reactor. The dogs (2) for lifting and/or holding the control shaft (1) are provided with at least two teeth (4) separated by a distance equalling that separating two successive grooves (3) of the shaft (1).

2 Claims, 4 Drawing Figures

APPARATUS WITH LINEAR MOVEMENT

This application is a continuation-in-part of application Ser. No. 209,925, filed Nov. 24, 1980 now abandoned.

FIELD OF THE INVENTION

The present invention relates to a linear motion device for vertically moving a control rod in the core of a nuclear reactor.

BACKGROUND

In a Pressurized Water Reactor (PWR), a certain number of linear motion devices are used for controlling the power of the reactor. Each device comprises a vertical control shaft connected to the upper end of the control rod and moved by electromagnetically actuated pawls. Such a device described, for example in the U.S. Pat. No. 3,158,766, allows a step by step movement of the control rod consisting of a cluster of neutron absorbing rods, in a fuel assembly of the core along the vertical direction. Each device is arranged in a sealed vessel in communication with the inside of the reactor vessel and mounted on its cover. A motion device, called control rod mechanism comprises two sets of pawls (or dogs), one set being mounted on a first support in the sealed vessel and the other being mounted on a second support movable in the vertical direction of the sealed vessel allowing the transfer of the control shaft and the control rod, The control shaft is provided with grooves equally spaced in the vertical direction and each dog of each set comprises a tooth engageable with play in a groove by rocking of the pawl under the effect of an electromagnetic actuation or impulse. Each dog is articulated on its support through an upper horizontal axle and on a connecting rod through a lower horizontal axle. The connecting rod is articulated at its end opposite to the pawl on a part of the electromagnetic actuation means. The rocking of the pawl is obtained through the connecting element. The support of the transfer pawl is also actuated by an electromagnetic means for is displacement along a vertical distance equalling that separating two successive grooves of the control shaft and corresponding to one step of displacement.

The holding pawls are actuated to engage their teeth in a groove of the control shaft at the end of a displacement to allow the return of the transfer pawls to their original position. The transfer pawls are actuated to engage the control shaft before effecting a displacement of the control shaft.

After the engagements of one set of pawls, a slight upward displacement of their support allows a disengagement of the other set of pawls without any friction.

Generally speaking, every movement of the pawls discribed in U.S. Pat. No. 3,158,766 is made without friction by means of the play between the teeth of the pawls and the grooves of the control shaft. Thus, the wear on the motion device is greatly reduced.

However, when the nuclear reactor is used with frequent displacements of the control rods, the wear on the dogs may become excessive after a certain period of operation and what is worse, a tooth may break and be separated from the pawl.

The physical phenomena responsible for the wear and breakage of the pawls in the control rod mechanisms are not accurately known at this time, except the fact that shock and vibrations are important factors in such discontinuous mechanisms.

It is necessary for the mechanisms to be sufficiently reliable to bear at least 10 million stops without breakage and without an excessive wear, under the conditions of use involving large stresses such as in the high power reactors built in recent years (1300 MW), which is not possible with the mechanisms of the prior art.

It has been previously proposed to replace mechanisms with pawls by other types of mechanisms such as screw and nut or electromagnetic coupling mechanisms. However the design of the reactor would have to be partly modified and adapted to the new type of mechanism.

SUMMARY OF THE INVENTION

It is therefore an object of the invention to provide a linear motion device for vertically moving a control rod in the core of a nuclear reactor comprising, in a sealed vessel in communication with the inside of the reactor vessel, a vertical control shaft provided with grooves equally spaced in the vertical direction, connected to the control rod at its lower end and two sets of pawls, on set being mounted on a first support in the sealed vessel for holding the control shaft and the other on a second support movable in the vertical direction in the sealed vessel for moving the control shaft, each pawl of each set being articulated on the corresponding support through a first horizontal axle, thus permitting the rocking of said pawl to engage or disengage toothed means formed by the pawl in a grooved means of the control shaft, by a displacement of the actuation means, the said mechanism permitting a very long life span of operation without excessive wear or breakage of the pawls, even in the case of frequent use and heavy stresses on the pawls.

For this purpose, each of said pawls comprises two engaging teeth, one upper tooth and one lower tooth, the tips of which are separated by a vertical distance equalling that separating two successive grooves of the control shaft and said lower axle of each of said pawls is centered at a location on said pawl situated under and at a vertical distance from the tip of said upper tooth between 1/6 and ¼ of the vertical distance separating the two tips of said engaging teeth on said pawl.

In order to make the invention more fully understood, an embodiment of a linear motion device for moving a control rod in the core of a Pressurized Water Reactor will now be described with reference to the accompanying drawings, purely by way of non limiting example.

DETAILED DESCRIPTION

Figure 1:
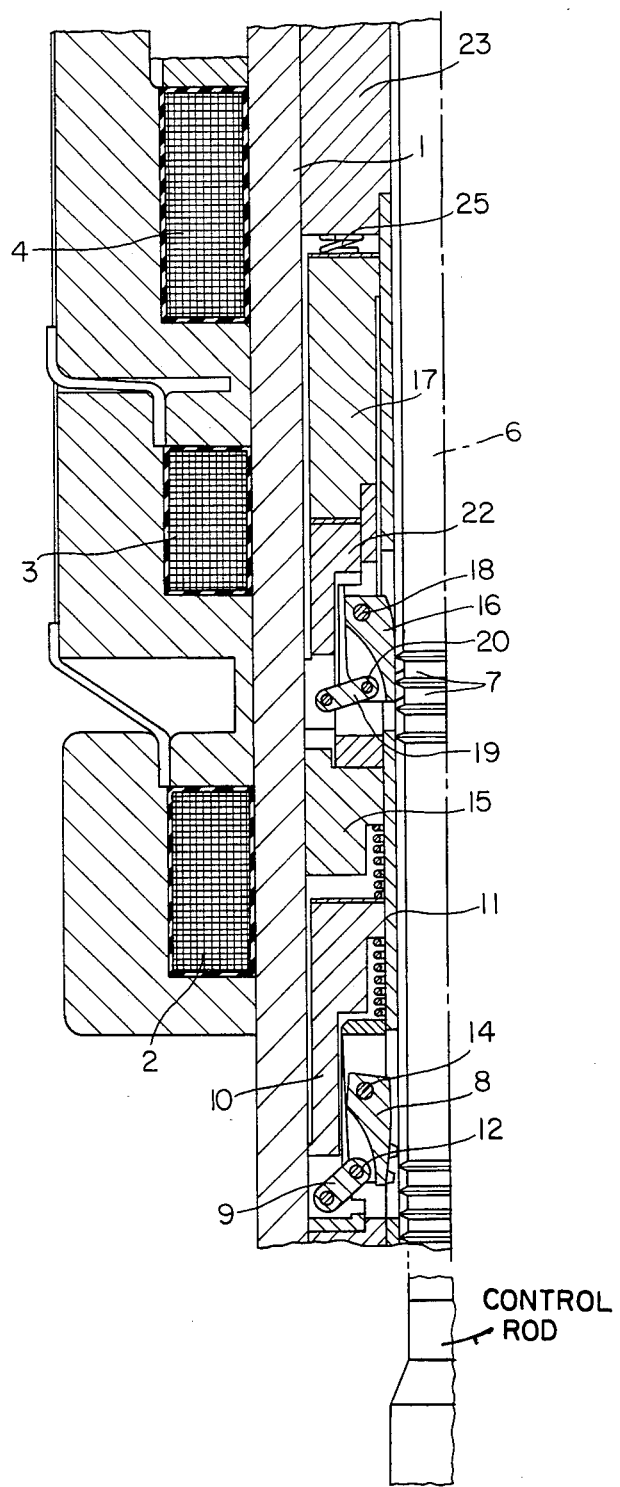
FIG. 1 is a fragmentary view in section through a vertical plane of a linear motion device for moving a control rod in a Pressurized Water Reactor.

In FIG. 1, is seen a sealed vessel 1 which is fixed at its lower part (not shown) on the cover of the reactor vessel. Inside the sealed vessel and along its axis is disposed a control shaft 6 provided with grooves and equally spaced in the vertical direction. Three magnetic coils 2,3 and 4 are arranged around the sealed vessel. The coil 2, called the holding coil permits the actuation of a set of three holding pawls 8 disposed at 120° around the control shaft 6. The holding pawls 8 are mounted rockable through upper axles 14 on a support 11 fixed in the sealed vessel 1. The holding pawls 8 are actuated through the intermediary of links 9 constituting connecting elements articulated through axles 12 on the pawls at one of their ends and on a movable magnetic piece 10 at their other ends. The energization of the coil 2 permits the movable magnetic piece 10 to be attracted and maintained in its top position against a fixed magnetic piece 15. The double-toothed pawl 8 is shown in FIG. 1 in its open position.

The coil 3 permits the closure of three pawls 16 disposed around the control shaft 6, called transfer pawls, mounted rockably on a support 17 through horizontal upper axle 18. The transfer pawls 16 are actuated through the intermediary of links 19 articulated through axle 20 on the pawls at one of their ends and on a movable magnetic piece 22 at their other ends. The magnetic piece 22 is mounted movable in the vertical direction on the support 17. The energization of the coil 3 permits the movable piece 22 to be attracted and maintained in its top position against a part of the support 17 made of magnetic material. THe double-toothed pawl 16 is shown in its closed position in FIG. 1.

In this position the set of pawls 16 connects the control shaft 16 and the support 17.

The support 17 is mounted movable in the vertical direction on the support 11 fixed in the sealed vessel 1. The coil permits the movable support 17 to be moved between a top position in which it is stuck by magnetic attraction to a fixed piece 23 and a bottom position to which it is returned by a spring 25. Generally speaking, the movable magnetic pieces are returned to the bottom position by springs. The transfer pawls 16, the amplitude of movement of which is equal to the distance between two grooves 7 of the control shaft 6, permits the control shaft 6 and the control rod which is connected to it to be moved upwards and downwards in a vertical movement, the amplitude of which is equal to the pitch of the control shaft grooves. After each pitch or step, the holding pawls 8 resume charge of the control shaft 6, which permits the transfer pawls to be returned into their initial position after having been opened by means of the coil 3. The movements of the control shaft 6 are executed step by step by means of the three coils 2,3 and 4 energized in succession.

Figure 2:
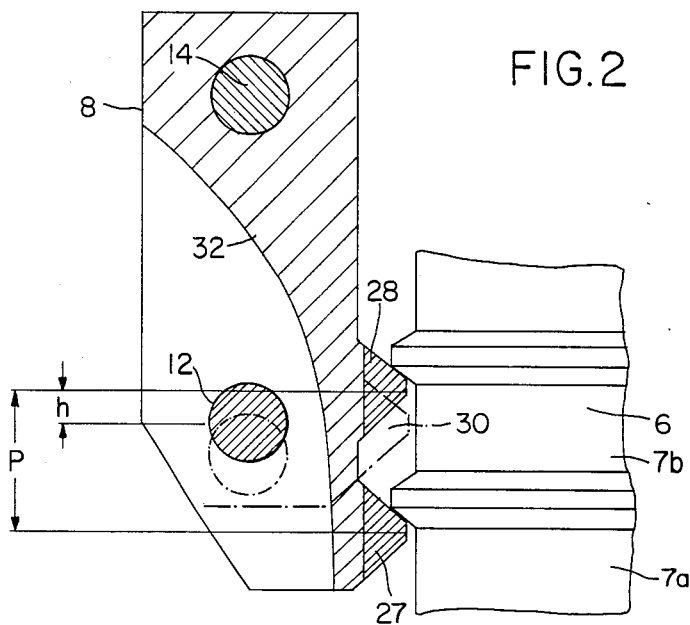
FIG. 2 is an enlarged view of a pawl of a device of the invention shown comparatively to a pawl of the prior art.

In FIG. 2, is seen a pawl 8 (or 16) in its closed position where it holds the control shaft 6, the two teeth 27 and 28 of the pawl being engaged in two successive grooves 7a and 7b of the control shaft 6 that bears on the teeth 27 and 28. When the teeth of the pawl are being engaged in the grooves 7, the teeth 27 and 28 are not in contact with the control shaft 6 due to the fact that the groove 7 are wider than the teeth and that the position of the pawl is such that the teeth are centered with respect to the position of the grooves 7. A subsequent upward movement of the pawls permits the control shaft to bear on the pawl teeth. The wear of the pawls and of the control shaft is thus reduced as there is no friction between them as explained in the U.S. Pat. No. 3,158,766. As seen in FIG. 2, the vertical distance between the tips of the two teeth 27 and 28 equals the pitch of the control shaft 6 or the step interval of the mechanism. In FIG. 2 the tooth 3 and the lower part of a pawl of the prior art has been drawn in dotted lines to show the differences between the pawl of the invention and the pawl of the prior art. The distance between the upper axle 14 and the lower axle 12 of the pawl has been kept unchanged so that the mechanism could remain unchanged except the substitution of pawls. An opening 32 of same shape is also provided on both pawls to permit the rocking of the link 9 (or 19) around the lower axle 12. For the pawl of the prior art the horizontal axis of axle 12 is at the same vertical level as the tip of the tooth 30.

It has been discovered by applicant that the physical phenomena responsible for the wear and the breakage of the pawls and of the control shaft are very complex and related to shock and vibration. It has been also discovered that by providing the pawl with two teeth like 27 and 28 the resistance to wear and to fatigue breakage of the pawl is greatly increased if the lower axle 12 is centered on an axis situated about at a vertical distance $h=1/5p$ below the tip of the upper tooth 28. With this position of the lower axle, the increase in resistance to wear and strength is obtained even if the contact between the two teeth and the control shaft did not occur at precisely the same time due to inaccurate machining of these parts. Thus, the increase in the wear resistance cannot be explained only by the increase of the surface of contact between the pawls and the control shaft.

Figure 3:
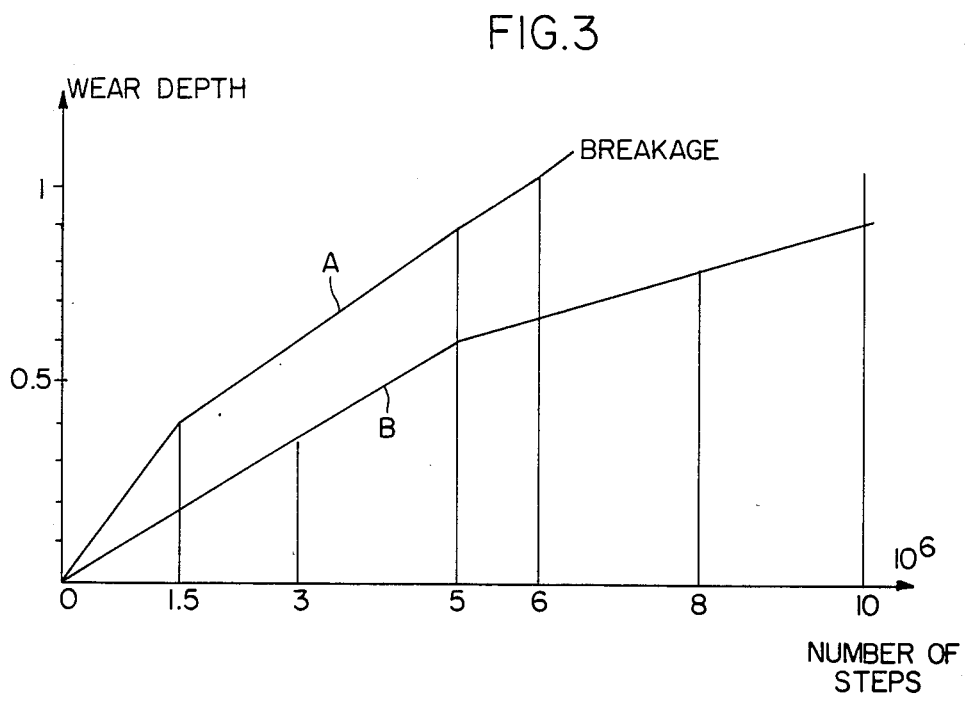
FIG. 3 is a diagram representing comparatively the wear of a pawl of the prior art and the wear of a pawl of the invention as a function of the number of steps or displacements of a corresponding linear motion device.
Figure 4:
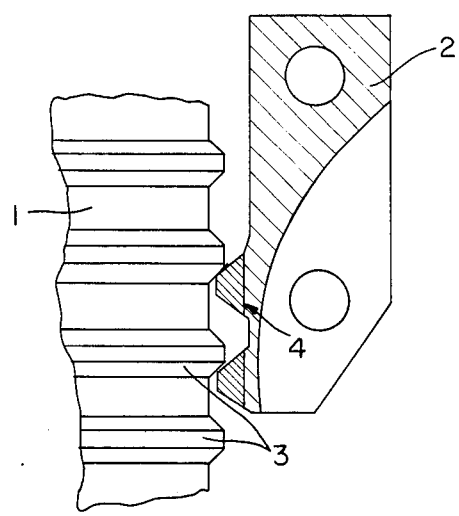
FIG. 4 is a view of a pawl of a device of the invention.

This result has been illustrated in FIG. 3 where the mean wear of a certain number of pawls belonging to different mechanisms have been represented as a function of the number of steps of displacement of the control shaft actuated by the pawls. The wear is determined as the means depth of the metal worn off the teeth of the pawls. The number of steps is given in million steps ($10^6$).

Curve A relates to pawls belonging to mechanisms of the prior art (one-toothed pawls) and Curve B to pawls belonging to mechanisms of the invention (double-toothed pawls), the two types of pawls being used in the same conditions to move control rods of a 1300 MW Pressurized Water Reactor. The wear rate of the pawls of the invention is rather decreasing and tends to be stabilized after about 5 million steps. Finally, the pawls of the invention are still operating after more than 10 million steps. On the contrary the sets of pawls of the prior art had to be stopped before at 6 million steps due to fatigue rupture or fatigue cracks. Applicant's experiments have shown that comparable results are obtained if there are provided two teeth on each pawl spaced by a distance equalling the pitch of the control shaft and if the lower axle of the pawl is centered at a vertical distance comprised between 1/6 and ¼ of the pitch P below the tip of the upper tooth.

If another arrangement of the lower axle is chosen in a double-toothed pawl, the wear is reduced compared to a one-toothed pawl but the risks of breakage remain great and operation over more than 10 million steps cannot be guaranteed.

Thus the control rod mechanism of the invention is suitable for use under high stresses and with frequent displacements of the control rod as in the high-power reactors built in recent years.

The invention is applicable to reactors comprising control rods moved step by step for the regulating of the power of the reactor.

I claim:

1. A linear motion device comprising:
   (a) an axially movable vertical drive shaft provided with a plurality of circumferential grooves equally spaced in the vertical direction, said drive shaft being arranged for connection with a nuclear reactor control rod at the lower end thereof, and
   (b) two gripping devices axially spaced relative to said drive shaft, each of said devices having:
      (i) a set of identical pawls each pivotally connected to a first support for pivotal movement about an upper horizontal axis into and out of engagement with said grooves,
      (ii) an actuation member axially movable between a first position and a second position with respect to said support, and
      (iii) link means pivotally connected to said pawls about a lower horizontal axis located at a level lower than said upper axis and pivotally connected to said actuation member, said link means being located and dimensioned for causing pivotal movement of said pawls into engagement with said grooves responsive to movement of said actuation member into its first position and out of engagement with said grooves upon movement of said actuation member into said second position.
   (c) wherein each of said pawls comprises an upper tooth and a lower tooth separated by a vertical distance equal to the distance between two successive grooves of said drive shaft and wherein said lower axis is located at a vertical distance below the tip of said upper tooth which is between one sixth and one fourth of the vertical distance separating the tips of said upper tooth and said lower tooth on one of said pawls.

2. Linear motion device according to claim 1 wherein said lower axis of said pawl is centered at a location situated below said upper tooth at a vertical distance of about 1/5 of the vertical distance separating the two tips of said engaging teeth on said pawl.

* * * * *